(12) United States Patent
Muramatsu et al.

(10) Patent No.: US 6,989,999 B2
(45) Date of Patent: Jan. 24, 2006

(54) CHARGE PUMP TYPE DC/DC CONVERTER HAVING STEPWISE ADJUSTABLE OUTPUT VOLTAGE

(75) Inventors: Yasunori Muramatsu, Tokyo (JP); Tetsuo Tateishi, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/763,292

(22) Filed: Jan. 23, 2004

(65) Prior Publication Data

US 2004/0222775 A1 Nov. 11, 2004

(30) Foreign Application Priority Data

Jan. 23, 2003 (JP) .............................. 2003-015431

(51) Int. Cl.
*H02M 3/18* (2006.01)

(52) U.S. Cl. ........................... 363/60; 363/59; 327/536

(58) Field of Classification Search ................ 327/536; 363/59, 60
See application file for complete search history.

(56) References Cited

U.S. PATENT DOCUMENTS

| | | | |
|---|---|---|---|
| 5,111,375 A * | 5/1992 | Marshall | 363/60 |
| 5,132,895 A * | 7/1992 | Kase | 363/60 |
| 5,532,916 A * | 7/1996 | Tamagawa | 363/62 |
| 6,021,056 A * | 2/2000 | Forbes et al. | 363/60 |
| 6,046,626 A * | 4/2000 | Saeki et al. | 327/536 |
| 6,198,645 B1 * | 3/2001 | Kotowski et al. | 363/59 |
| 6,226,193 B1 * | 5/2001 | Bayer et al. | 363/59 |
| 6,504,422 B1 * | 1/2003 | Rader et al. | 327/536 |
| 6,677,805 B2 * | 1/2004 | Shor et al. | 327/536 |
| 6,794,926 B2 * | 9/2004 | Rader et al. | 327/536 |
| 6,847,250 B2 * | 1/2005 | Kim | 327/536 |

* cited by examiner

*Primary Examiner*—Bao Q. Vu
(74) *Attorney, Agent, or Firm*—William B. Kempler; W. James Brady, III; Frederick J. Telecky, Jr.

(57) ABSTRACT

A charge pump DC/DC converter having an improved the ripple characteristic in its output voltage and make it possible to adjust the boosting rate in a stepwise manner. In phase I, two flying capacitors $C_a$, $C_b$ are connected in series between voltage input terminal 12 and voltage output terminal 14. In this connection state, flying capacitor $C_a$ is charged by the current supplied from DC power supply 10, while flying capacitor $C_b$ discharges to the load side. In phase II, flying capacitor $C_a$ is connected between voltage input terminal 12 and voltage output terminal 14, while flying capacitor $C_b$ is connected between voltage input terminal 12 and the ground potential. In this connection state, flying capacitor $C_a$ discharges to the load side, while flying capacitor $C_b$ is charged by the current supplied from DC power supply 10.

16 Claims, 9 Drawing Sheets

CHARGE PUMP TYPE DC/DC CONVERTER HAVING STEPWISE ADJUSTABLE OUTPUT VOLTAGE

FIELD OF THE INVENTION

The present invention pertains to a charge pump type DC/DC converter.

BACKGROUND OF THE INVENTION

Typically, a DC/DC converter is used to convert a power supply voltage with an unstable level output from a DC power supply to a voltage with desired stable level. Since a charge pump type DC/DC converter uses capacitors as an energy storing element and needs no coil or reactor, it is small and inexpensive and has little EMI (electromagnetic interference). On the other hand, the voltage ripple is large, which is considered a problem.

FIG. 13 shows the theory of a conventional charge pump type DC/DC converter. This DC/DC converter is used for 1.5 times boosting. It has a voltage input terminal 122 connected to the output (positive) terminal of DC power supply 120, two flying capacitors $C_a$, $C_b$, capacitor $C_s$ for smoothing, and voltage output terminal 124 connected to a load (not shown in the figure). Smoothing capacitor $C_s$ is constantly connected between voltage output terminal 124 and the ground potential. Flying capacitors $C_a$, $C_b$ switch alternately between the connection state of phase I shown in FIG. 13(A) and the connection state of phase II shown in FIG. 13(B).

More specifically, in phase I, two flying capacitors $C_a$, $C_b$ are connected in series between voltage input terminal 122 and the ground potential in such a way that their positive terminals (+) face the side of voltage input terminal 122. In that connection state, two flying capacitors $C_a$, Cb are charged by the current flowing from DC power supply 120 to ground. In this case, when the capacitances of two flying capacitors $C_a$, $C_b$ are set equal to each other, two flying capacitors $C_a$, $C_b$ are charged to 0.5 $V_{in}$ with respect to the output voltage of DC power supply 120, that is, the power supply voltage $V_{in}$. During that period, smoothing capacitor $C_s$ is discharged to the load side via voltage output terminal 124 to maintain the supply of output voltage $V_{out}$ to the load.

In phase II, two flying capacitors $C_a$, $C_b$ are connected in parallel with each other between voltage input terminal 122 and voltage output terminal 124 in such a way that their positive terminals (+) face voltage output terminal 124. In that connection state, a voltage of 1.5 $V_{in}$ obtained by adding the charged voltage 0.5 $V_{in}$ of two flying capacitors $C_a$, $C_b$ to the power supply voltage $V_{in}$ obtained from DC power supply 120 is supplied to the load and smoothing capacitor $C_s$ via voltage output terminal 124.

In this DC/DC converter, when phases I and II are repeated and switched alternately, as shown in FIG. 14, an output voltage $V_{out}$, which approximately has a saw tooth waveform and decreases approximately monotonically in the period of phase I and increases approximately monotonically in the period of phase II, is obtained.

FIG. 15 shows the detailed circuit configuration of a DC/DC converter. In the switch circuit network shown in the figure, N-channel MOS transistors (referred to as "NMOS transistor" hereinafter) 126, 128, and 130 receive control signal φ from a switching control circuit (not shown in the figure) at their gate terminals and are turned on during the period of phase I and turned off during the period of phase II. On the other hand, NMOS transistors 132, 134, 136, and 138 receive control signal φ–, which has a phase difference of 180° from the control signal φ, from the switching control circuit at their gate terminals and are turned off during the period of phase I and turned on during the period of phase II.

As described above, in a conventional charge pump type DC/DC converter, although two flying capacitors $C_a$, $C_b$ are connected to the current path from DC power supply 120 during the period of phase I, no current path is formed between DC power supply 120 and voltage output terminal 124. The output voltage$_{out}$, which is only dependent on the discharge of smoothing capacitor $C_s$, decreases at a relatively steep slope. As a result, a large voltage ripple occurs in the output voltage$_{out}$.

An general object of the present invention is to solve the problem of the conventional technology by providing a charge pump type DC/DC converter with an improved ripple characteristic in the output voltage.

SUMMARY OF THE INVENTION

This and other objects and features is provided, in accordance with one aspect of the invention by a charge pump type DC/DC converter having the following: a voltage input terminal connected to the output terminal of a DC power supply; first and second capacitors; a voltage output terminal connected to a load; a switch circuit network having a first phase, in which a first terminal of the first capacitor is connected to the voltage input terminal, a first terminal of the second capacitor is connected to the voltage output terminal, and a second terminal of the first capacitor and a second terminal of the second capacitor are connected to each other, and a second phase, in which the first and second terminals of the first capacitor are connected to the voltage output terminal and the voltage input terminal, respectively, and the first and second terminals of the second capacitor are connected to the voltage input terminal and a reference potential, respectively; and a switching control means that controls the switch circuit network to switch the first and second phases alternately at prescribed duty ratios. The capacitors include a configuration having multiple capacitor elements.

In an aspect of the charge pump type DC/DC converter of the present invention, in the first phase, a current path is formed via the first and second capacitors between the voltage input terminal and the voltage output terminal. In the meantime when the first capacitor is charged by the current from the DC power supply, the second capacitor discharges to supply a load current to the side of the voltage output terminal. In the second phase, a current path is formed via the first capacitor between the voltage input terminal and the voltage output terminal, and a current path is formed via the second capacitor between the voltage input terminal and the reference potential (for example, the ground potential). The first capacitor discharges to supply a load current to the side of the voltage output terminal. On the other hand, the second capacitor is charged by the current from the DC power supply. Since a current path is formed between the voltage input terminal and voltage output terminal 14 and power is continuously supplied from the DC power supply to the load during both the first and second phases, the output voltage level can be maintained stably near the set voltage level.

According to another aspect of the present invention, the first capacitor is one capacitor element. In this case, it is preferred to set the capacitance of the first capacitor approximately equal to the capacitance of the second capacitor. Also, it is preferred to set the duty ratios of the first and second phases at about ½.

According to a further aspect of the present invention, the switch circuit network has a first MOS transistor with a first terminal connected to the voltage input terminal and a second terminal connected to the first terminal of the first capacitor, a second MOS transistor with a first terminal connected to the voltage input terminal and a second terminal connected to the second terminal of the first capacitor, a third MOS transistor with a first terminal connected to the voltage input terminal and a second terminal connected to the first terminal of the second capacitor, a fourth MOS transistor with a first terminal connected to the second terminal of the first capacitor and a second terminal connected to the second terminal of the second capacitor, a fifth MOS transistor with a first terminal connected to the second terminal of the second capacitor and a second terminal connected to the reference potential, a sixth MOS transistor with a first terminal connected to the first terminal of the first capacitor and a second terminal connected to the voltage output terminal, and a seventh MOS transistor with a first terminal connected to the first terminal of the second capacitor and a second terminal connected to the voltage output terminal. In this case, the switching control means turns on the first, fourth, and seventh MOS transistors and turns off the second, third, fifth, and sixth MOS transistors in the first phase and turns off the first, fourth, and seventh MOS transistors and turns on the second, third, fifth, and sixth MOS transistors in the second phase.

According to yet another aspect of the present invention, the first capacitor is comprised of n (n is an integer of 2 or larger) capacitor elements. The n capacitor elements are connected in series in the first phase. In the second phase, the n capacitor elements are connected in parallel with each other. In this case, it is preferred that the n capacitor elements have approximately the same capacitance. It is also preferred to set the duty ratio of the first phase at about $1/(n+1)$ and to set the duty ratio of the second phase at about $n/(n+1)$. The boosting rate is defined as $\{1+1/(n+1)\}$. The boosting rate can be adjusted in a stepwise manner by changing the value of n.

According to a still further aspect of the present invention, when n=2, the first capacitor is comprised of first and second capacitor elements. The switch circuit network has a first MOS transistor with a first terminal connected to the voltage input terminal and a second terminal connected to the first terminal of the first capacitor element, a second MOS transistor with a first terminal connected to the voltage input terminal and a second terminal connected to the second terminal of the first capacitor element, a third MOS transistor with a first terminal connected to the second terminal of the first capacitor element and a second terminal connected to the first terminal of the second capacitor element, a fourth MOS transistor with a first terminal connected to the voltage input terminal and a second terminal connected to the second terminal of the second capacitor element, a fifth MOS transistor with a first terminal connected to the voltage input terminal and a second terminal connected to the first terminal of the second capacitor, a sixth MOS transistor with a first terminal connected to the second terminal of the second capacitor element and a second terminal connected to the second terminal of the second capacitor, a seventh MOS transistor with a first terminal connected to the second terminal of the second capacitor and a second terminal connected to the reference potential, an eighth MOS transistor with a first terminal connected to the first terminal of the first capacitor element and a second terminal connected to the voltage output terminal, a ninth MOS with a first terminal connected to the first terminal of the second capacitor element and a second terminal connected to the voltage output terminal, and a tenth MOS transistor with a first terminal connected to the first terminal of the second capacitor and a second terminal connected to the voltage output terminal. In this case, preferably, the switching control means turns on the first, the third, the sixth, and the tenth MOS transistors and turns off the second, the fourth, the fifth, the seventh, the eighth, and the ninth MOS transistors in the first phase and turns off the first, the third, the sixth, and the tenth MOS transistors and turns on the second, the fourth, the fifth, the seventh, the eighth, and the ninth MOS transistors in the second phase.

According to a further aspect of the present invention, the first capacitor is comprised of n (n is an integer of 2 or larger) capacitor elements. The n capacitor elements are connected in parallel with each other in the first phase. In the second phase, the n capacitor elements are connected in series. In this case, it is preferred that the n capacitor elements have approximately the same capacitance. It is also preferred to set the duty ratio of the first phase at about $n/(n+1)$ and to set the duty ratio of the second phase at about $1/(n+1)$. The boosting rate is defined as $\{2-1/(n+1)\}$. The boosting rate can be adjusted in a stepwise manner by changing the value of n.

According to another aspect of the present invention, when n=2, the first capacitor is comprised of first and second capacitor elements. The switch circuit network has a first MOS transistor with a first terminal connected to the voltage input terminal and a second terminal connected to the first terminal of the first capacitor element, a second MOS transistor with a first terminal connected to the second terminal of the first MOS transistor and a second terminal connected to the first terminal of the second capacitor element, a third MOS transistor with a first terminal connected to the second terminal of the first capacitor element and a second terminal connected to the first terminal of the second capacitor element, a fourth MOS transistor with a first terminal connected to the voltage input terminal and a second terminal connected to the second terminal of the second capacitor element, a fifth MOS transistor with a first terminal connected to the second terminal of the first capacitor element and a second terminal connected to the second terminal of the second capacitor element, a sixth MOS transistor with a first terminal connected to the voltage input terminal and a second terminal connected to the first terminal of the second capacitor, a seventh MOS transistor with a first terminal connected to the second terminal of the second capacitor element and a second terminal connected to the second terminal of the second capacitor, an eighth MOS transistor with a first terminal connected to the second terminal of the second capacitor and a second terminal connected to the reference potential, a ninth MOS transistor with a first terminal connected to the first terminal of the first capacitor element and a second terminal connected to the voltage output terminal, and a tenth MOS transistor with a first terminal connected to the first terminal of the second capacitor and a second terminal connected to the voltage output terminal. In this case, the switching control means turns on the first, the second, the fifth, the seventh, and the tenth MOS transistors and turns off the third, the fourth, the sixth, the eighth, and the ninth MOS transistors in the first phase and turns off the first, the second, the fifth, the seventh, and the tenth MOS transistors and turns on the third, the fourth, the sixth, the eighth, and the ninth MOS transistors in the second phase.

According to a still further aspect of the present invention, the first capacitor is comprised of n×m (n and m are integers of 2 or larger) capacitor elements. In the first phase, for the n×m capacitor elements, all n capacitor elements are connected in series, and these serial capacitor circuits are connected in parallel in m columns. In the second phase, for the n×m capacitor elements, all m capacitor elements are connected in series, and these serial capacitor circuits are connected in parallel in n columns. In this case, it is preferred that the n×m capacitor elements have approximately the same capacitance. Also, it is preferred to set the duty ratio of the first phase at about m/(n+m) and to set the duty ratio of the second phase to about n/(n+m). The boosting rate is defined as {1+m/(n+m)} and can be adjusted in a stepwise manner by changing the values of n, m.

According to yet another aspect of the present invention, when n=2, m=2, the first capacitor is comprised of first, second, third, and fourth capacitor elements. The switch circuit network has a first MOS transistor with a first terminal connected to the voltage input terminal and a second terminal connected to the first terminal of the third capacitor element, a second MOS transistor with a first terminal connected to the first terminal of the third capacitor element and a second terminal connected to the first terminal of the first capacitor element, a third MOS transistor with a first terminal connected to the voltage input terminal and a second terminal connected to the second terminal of the first capacitor element, a fourth MOS transistor with a first terminal connected to the second terminal of the first capacitor element and a second terminal connected to the first terminal of the second capacitor element, a fifth MOS transistor with a first terminal connected to the voltage input terminal and a second terminal connected to the second terminal of the second capacitor element, a sixth MOS transistor with a first terminal connected to the second terminal of the third capacitor element and a second terminal connected to the first terminal of the fourth capacitor element, a seventh MOS transistor with a first terminal connected to the first terminal of the first capacitor element and a second terminal connected to the second terminal of the third capacitor element, an eighth MOS transistor with a first terminal connected to the first terminal of the second capacitor element and a second terminal connected to the second terminal of the fourth capacitor element, a ninth MOS transistor with a first terminal connected to the second terminal of the second capacitor element and a second terminal connected to the second terminal of the fourth capacitor element, a tenth MOS transistor with a first terminal connected to the voltage input terminal and a second terminal connected to the first terminal of the second capacitor, an eleventh MOS transistor with a first terminal connected to the second terminal of the fourth capacitor element and a second terminal connected to the second terminal of the second capacitor, a twelfth MOS transistor with a first terminal connected to the second terminal of the second capacitor and a second terminal connected to the reference potential, a thirteenth MOS transistor with a first terminal connected to the first terminal of the third capacitor element and a second terminal connected to the voltage output terminal, a fourteenth MOS transistor with a first terminal connected to the first terminal of the fourth capacitor element and a second terminal connected to the voltage output terminal, and a fifteenth MOS transistor with a first terminal connected to the first terminal of the second capacitor and a second terminal connected to the voltage output terminal. In this case, the switching control means turns on the first, the second, the fourth, the sixth, the ninth, the eleventh, and the fifteenth MOS transistors and turns off the third, the fifth, the seventh, the eighth, the tenth, the twelfth, the thirteenth, and the fourteenth MOS transistors in the first phase and turns off the first, the second, the fourth, the sixth, the ninth, the eleventh, and the fifteenth MOS transistors and turns on the third, the fifth, the seventh, the eighth, the tenth, the twelfth, the thirteenth, and the fourteenth MOS transistors in the second phase.

According to a further aspect of the present invention, in order to further reduce the ripple in the output voltage, a third capacitor for smoothing with a first terminal connected to the voltage output terminal and a second terminal connected to the reference potential is adopted. In addition, according to another preferable embodiment of the present invention, in order to further reduce the ripple in the output voltage and to finely set and adjust the output voltage, a current control circuit that is connected in series between the voltage input terminal and the first capacitor, a voltage detecting means used for detecting the output voltage obtained at the voltage output terminal, a reference voltage generating means that can generate a reference voltage corresponding to the set value of the output voltage output from the voltage output terminal, and a current control means that compares the output voltage detected by the voltage detecting means with the reference voltage and controls the current of the current control circuit corresponding to the comparison error are adopted. Also, it is preferred to turn off all the MOS transistors simultaneously in the phase switching period between the first and second phases.

REFERENCE NUMERALS AND SYMBOLS AS SHOWN IN THE DRAWINGS

Figure 1A:
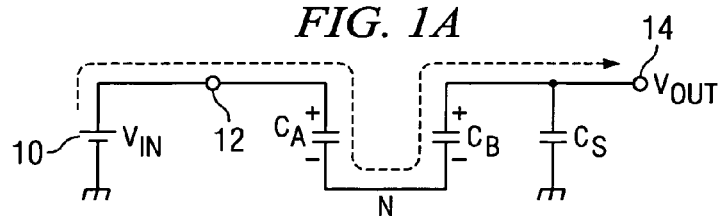
FIG. 1 is a circuit diagram illustrating the theory of the charge pump type DC/DC converter disclosed in the first embodiment of the present invention.

In the figures, 10 represents a DC power supply, 12 a voltage input terminal, 14 a voltage output terminal, $C_a$, $C_b$ flying capacitors, 16–28 NMOS transistors, 30 clock circuit, 32 a feedback circuit, 34 a current control circuit, 36 a resistance type voltage dividing circuit, 38 a reference voltage generating circuit, 40 a comparator, $C_{a1}$–$C_{an}$ flying capacitor elements, 42–80 a NMOS transistors; $C_{a11}$ ... $C_{an1}$, $C_{a1m}$ ... $C_{anm}$ flying capacitor elements, and 82–110 NMOS transistors

DESCRIPTION OF THE EMBODIMENTS

In the following, preferable embodiments of the present invention will be explained with reference to FIGS. 1–12.

FIG. 1 shows the theory of the charge pump type DC/DC converter disclosed in the first embodiment of the present invention.

This DC/DC converter is used for 1.5-times boosting. It has voltage input terminal 12 connected to the output (positive) terminal of DC power supply 10, a pair of flying capacitors $C_a$, $C_b$, each of which is constituted with one capacitor element, capacitor $C_s$ for smoothing, and voltage output terminal 14 connected to a load (not shown in the figure). Smoothing capacitor $C_s$ is constantly connected between voltage output terminal 14 and the ground potential. Flying capacitors $C_a$, $C_b$ are switched alternately between the connection state of phase I shown in FIG. 1(A) and the connection state of phase II shown in FIG. 1(B).

More specifically, in phase I, two flying capacitors $C_a$, $C_b$ are connected in series between voltage input terminal 12 and voltage output terminal 14. In this case, the positive terminal of flying capacitor $C_a$ is connected to voltage input terminal 12. The positive terminal of flying capacitor $C_b$ is connected to voltage output terminal 14. The negative terminals (−) of the two flying capacitors $C_a$, $C_b$ are connected to each other. In this connection state, flying capacitor $C_a$ is charged by the current supplied from DC power supply 10, while flying capacitor $C_b$ discharges to the side of the load. Smoothing capacitor $C_s$ absorbs (charges) current from flying capacitor $C_b$ or self-discharges to the load side corresponding to the voltage difference between the charged voltage and the output voltage of flying capacitor $C_b$ and the voltage on the load side to reduce variation of output voltage $V_{out}$.

In phase II, flying capacitor $C_a$ is connected between voltage input terminal 12 and voltage output terminal 14, while flying capacitor $C_b$ is connected between voltage input terminal 12 and the ground potential. In this case, the positive terminal (+) of flying capacitor $C_a$ is connected to voltage output terminal 14, while its negative terminal (−) is connected to voltage input terminal 12. The positive terminal (+) of flying capacitor $C_b$ is connected to voltage input terminal 12, and its negative terminal (−) is connected to the ground potential. In this connection state, flying capacitor $C_a$ discharges to the load side, while flying capacitor $C_b$ is charged by current supplied from DC power supply 10. Smoothing capacitor $C_s$ absorbs (charges) current from flying capacitor $C_a$ or self-discharges to the load side corresponding to the voltage difference between its charged voltage and the output terminal of flying capacitor $C_a$ and the voltage on the load side to suppress variation in output voltage $V_{out}$.

The output voltage $V_{out}$ obtained at output voltage terminal 14 is derived as follows. When the charged voltages or voltage drops of flying capacitors $C_a$, $C_b$ are represented by $V_{Ca}$, $V_{Cb}$, respectively, in phase II, equation (1) listed below becomes valid for flying capacitor $C_a$, while equation (2) listed below becomes valid for flying capacitor $C_b$.

$$V_{Ca} = V_{out} - V_{in} \tag{1}$$

$$V_{Cb} = V_{in} \tag{2}$$

In phase I, since flying capacitors $C_a$, $C_b$ are connected in series between voltage input terminal 12 and voltage output terminal 14 as described above, equation (3) listed below becomes valid.

$$V_{out} = V_{in} - V_{ca} + V_{Cb} \tag{3}$$

Equation (4) is obtained by substituting equations (1) and (2) into equation (3).

$$V_{out} = 1.5 \, V_{in} \tag{4}$$

In this embodiment, about 1.5-times boosting can be realized even if no special condition ($C_a = C_b$) is set for the capacitances of flying capacitors $C_a$, $C_b$.

Figure 2:
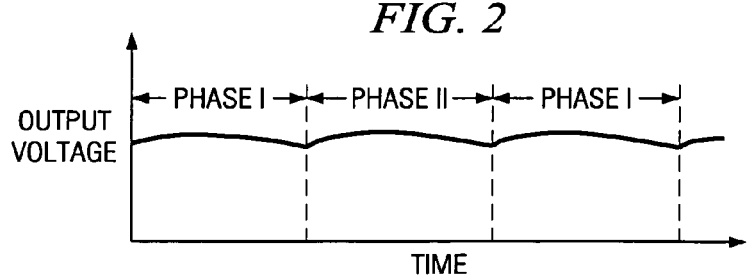
FIG. 2 is a voltage waveform diagram schematically illustrating the waveform of the output voltage obtained in the first embodiment.

When phases I and II are repeated and switched alternately in this DC/DC converter, as shown in FIG. 2, an output voltage$_{out}$ with approximately flat waveform having a stabilized voltage level in both periods of phases I and II is obtained. In other words, since a current path is formed between voltage input terminal 12 and voltage output terminal 14 in both phases I and II to supply current to the load without interrupting the power from DC power supply 10, the voltage level of output voltage $V_{out}$ can be stably retained near the set value (about 1.5 $V_{in}$).

Figure 3:
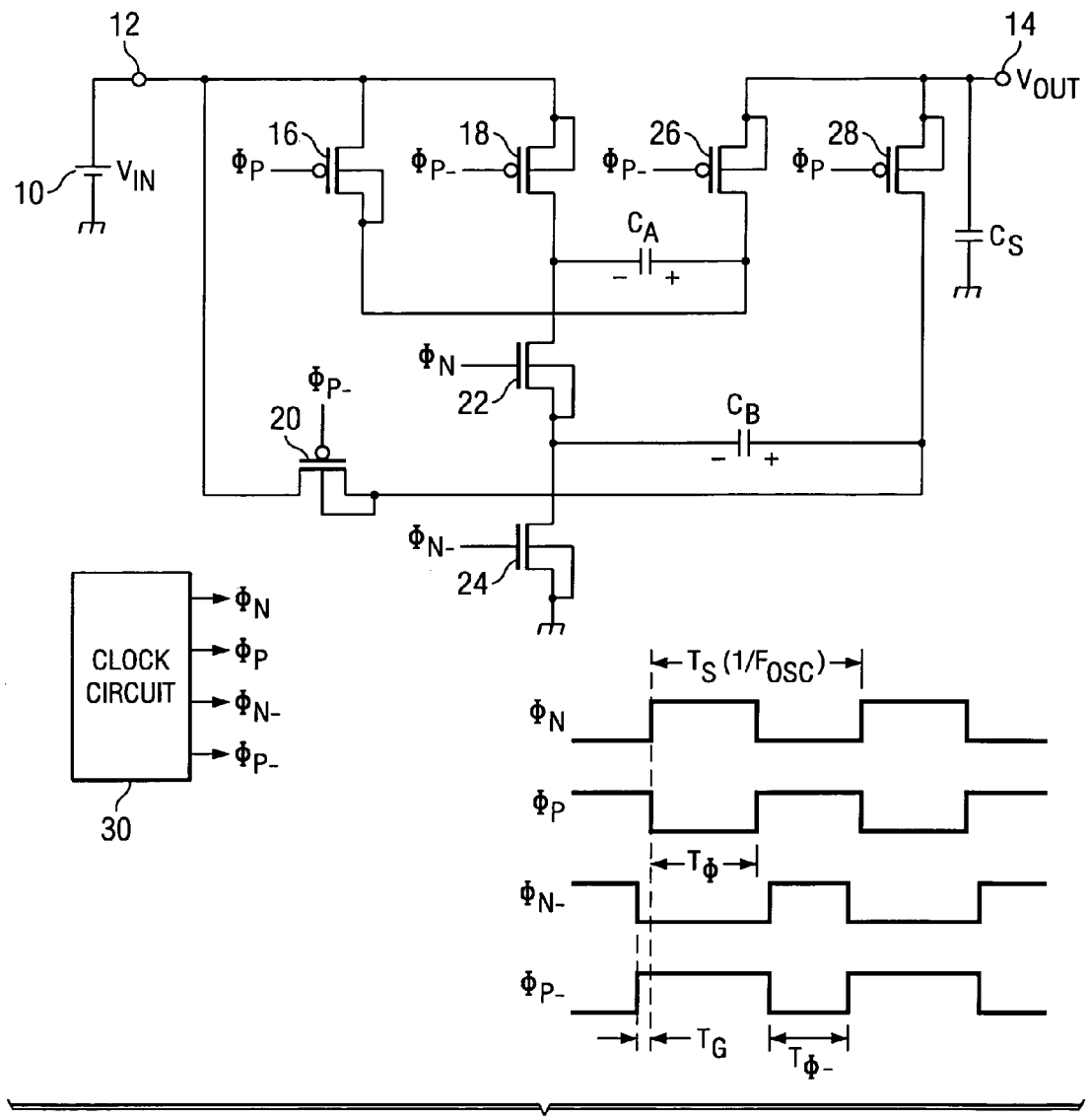
FIG. 3 is a circuit diagram illustrating an example of the switch circuit network used in the first embodiment.

FIG. 3 shows an example of a switch circuit network used for realizing the switching between phases I and II in the embodiment described above. This switch circuit network includes two NMOS transistors 22 and 24 and 5 P-channel MOS transistors (referred to as "PMOS transistor" hereinafter) 16, 18, 20, 26, 28 as switching elements.

The source terminal of PMOS transistor 16 is connected to voltage input terminal 12, and its drain terminal is connected to the positive terminal of flying capacitor $C_a$. The source terminal of PMOS transistor 18 is connected to voltage input terminal 12, and its drain terminal is connected to the negative terminal of flying capacitor $C_a$. The source terminal of PMOS transistor 20 is connected to voltage input terminal 12, and its drain terminal is connected to the positive terminal of flying capacitor $C_b$. The drain terminal of NMOS transistor 22 is connected to the negative terminal of flying capacitor $C_a$, and its source terminal is connected to the negative terminal of flying capacitor $C_b$. The drain terminal of NMOS transistor 24 is connected to the negative terminal of flying capacitor $C_b$, and its source terminal is connected to the ground potential. The drain terminal of PMOS transistor 26 is connected to the positive terminal of flying capacitor $C_a$, and its source terminal is connected to voltage output terminal 14. The drain terminal of PMOS transistor 28 is connected to the positive terminal of flying capacitor $C_b$, and its source terminal is connected to voltage output terminal 14.

A clock signal $\phi_N$ is sent from clock circuit 30 to the gate terminal of NMOS transistor 22. A clock signal $\phi_{N-}$ is sent from clock circuit 30 to the gate terminal of NMOS transistor 24. A clock signal $\phi_P$ is sent from clock circuit 30 to the gate terminals of PMOS transistors 16, 28. A clock signal $\phi_{P-}$ is sent from clock circuit 30 to the gate terminals of NMOS transistors 18, 20, and 26. The signal waveforms of clock signals $\phi_N$, $\phi_{N-}$, $\phi_P$, $\phi_{P-}$ are shown in FIG. 3. $\phi_N$ is the reversed signal of $\phi_P$. $\phi_{N-}$ is the reversed signal of $\phi_{P-}$.

When PMOS transistor 26 is turned on, [the voltage at] the positive terminal of capacitor $C_a$ becomes approximately equal to the output voltage. At that time, in order to prevent a short circuit between voltage output terminal 14 and voltage input terminal 12 as a result of turning on the parasitic diode of PMOS transistor 16, the back gate of PMOS transistor 16 is connected to the positive terminal of capacitor $C_a$. When PMOS transistor 26 is turned on, PMOS transistor 16 becomes inversely biased. When PMOS transistor 28 is turned on, the positive terminal of capacitor $C_b$ becomes approximately equal to the output voltage. At that time, in order to prevent a short circuit between voltage output terminal 14 and voltage input terminal 12 as a result of turning on the parasitic diode of PMOS transistor 20, the back gate of PMOS transistor 20 is connected to the positive terminal of capacitor $C_b$. When PMOS transistor 28 is turned on, PMOS transistor 20 becomes inversely biased.

When $\phi_N$, $\phi_{P-}$ are at H level and $\phi_{N-}$, $\phi_P$ are at L level, transistors 16, 22, 28 are turned on, while transistors 18, 20, 24, and 26 are turned off. The connection state of phase I shown in FIG. 1(A) is obtained. If the period of the clock cycle (frequency $F_{osc}$) is taken as $T_s(1/F_{osc})$ and the H level duration time of $\phi_N$ (L level duration time of $\phi_P$) is taken as $T_\phi$, the duty ratio of phase I is defined as $T_\phi/T_s$.

Figure 1B:
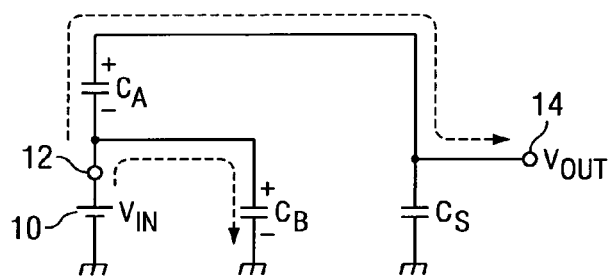

When $\phi_N$, $\phi_{P-}$ are at L level and $\phi_{N-}$, $\phi_P$ are at H level, transistors 16, 22, 28 are turned off, while transistors 18, 20, 24, and 26 are turned on. The connection state of phase II shown in FIG. 1(B) is obtained. If the H level duration time of $\phi_{N-}$ (L level duration time of $\phi_P$) is taken as $T_{\phi-}$, the duty ratio of phase II is defined as $T_{\phi-}/T_s$.

During the phase switching period from phase I to phase II or vice versa, it is preferred to set a period $T_g$, during which clock signals $\phi_N$, $\phi_{N-}$ become L level simultaneously or clock signals $\phi_P$, $\phi_{P-}$ become H level simultaneously, to turn off all of transistors 16–28 simultaneously.

By using the DC/DC converter disclosed in this embodiment, as described above, even if the capacitances of the two flying capacitors $C_a$, $C_b$ are different, 1.5-times boosting can still be realized. However, the capacitances of the two flying capacitors or capacitor elements $C_a$, $C_b$ are usually set at the same value. The duty ratios of the two phases I and II are also set equal to each other (about 0.5).

Figure 4:
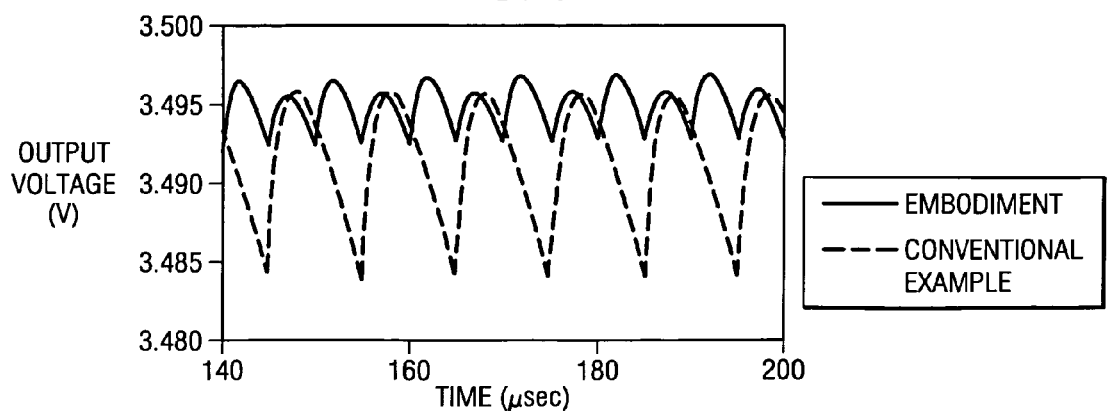
FIG. 4 is a voltage waveform diagram comparing the simulated output voltage obtained in the first embodiment with the conventional example.
Figure 15:
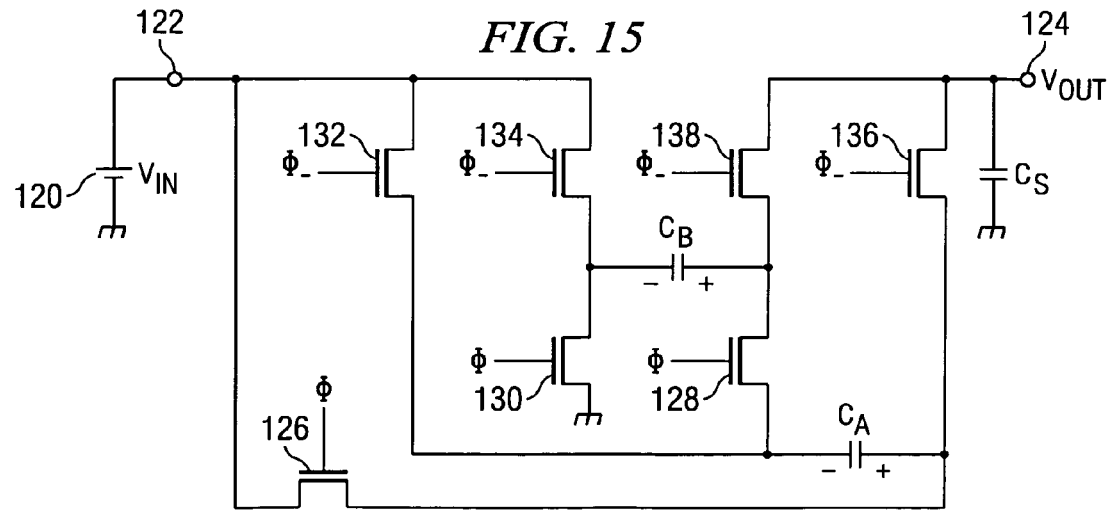
FIG. 15 is a circuit diagram illustrating the configuration of the switch circuit network used in the conventional charge pump type DC/DC converter.

FIG. 4 compares the simulated output voltage waveform of the DC/DC converter disclosed in this embodiment with that of the conventional example (FIG. 15). $V_{in}$=2.4 V, $C_a$=$C_b$=0.1 μF, $I_{out}$=2 mA, $F_{osc}$=100 kHz are set as the main conditions. The voltage ripple of the conventional example is about 12 mV. On the other hand, the voltage ripple of the embodiment is about 4 mV. The voltage ripple is reduced to about ⅓.

Figure 5A:
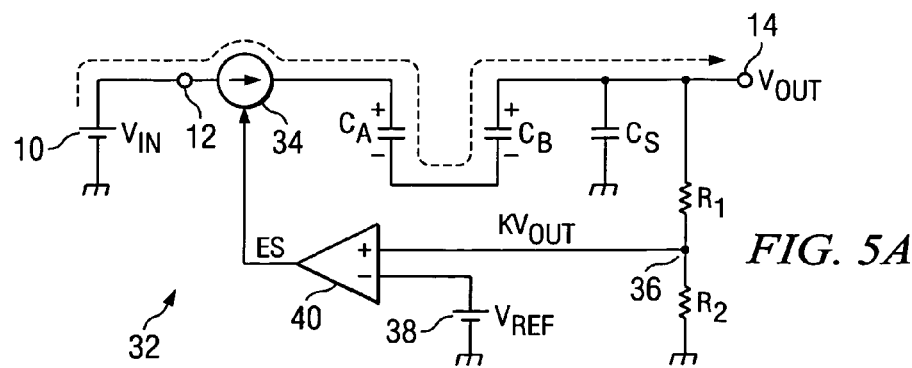
FIG. 5 is a circuit diagram illustrating the theory of the charge pump type DC/DC converter disclosed in the second embodiment of the present invention.
Figure 5B:
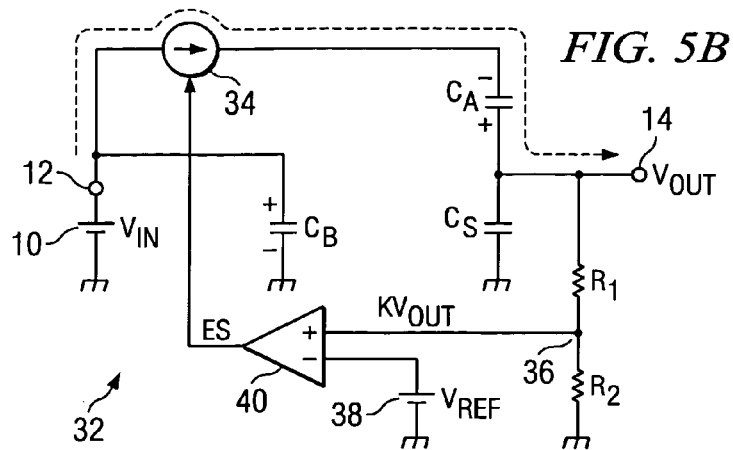

FIG. 5 shows the configuration of the main parts of the charge pump type DC/DC converter disclosed in the second embodiment. This embodiment adopts a feedback circuit 32 used for further stabilizing the voltage level of the output voltage $V_{out}$ in the DC/DC converter disclosed in the first embodiment.

Said feedback circuit 32 has a current control circuit 34 connected between voltage input terminal 12 and flying capacitor $C_a$, a resistance type voltage dividing circuit 36 for voltage detection comprised of two resistors R1, R2 connected in series between voltage output terminal 14 and the ground potential, a reference voltage generator 38 that generates reference voltage $V_{REF}$ corresponding to the set value of output voltage $V_{out}$, and a comparator 40 that compares the output voltage $KV_{out}$ (K is a coefficient) of resistance type voltage dividing circuit 36 with reference voltage $V_{REF}$ and outputs comparison error voltage ES.

Current control circuit 34 is, for example, constituted with a PMOS transistor. It controls the current supplied from DC power supply 10 to voltage output terminal 14 via flying capacitor $C_a$ (or $C_a$, $C_b$) corresponding to the comparison error voltage ES sent from comparator 40 to its gate terminal. More specifically, when output voltage $V_{out}$ is higher than the set level, the output (comparison error voltage) ES of comparator 40 is increased in proportion to the absolute value of the comparison error, and current control circuit 34 operates to reduce the current. When output voltage $V_{out}$ is lower than the set level, the output (comparison error voltage) ES of comparator 40 is decreased in proportion to the absolute value of the comparison error, and current control circuit 34 operates to increase the current. Reference voltage generator 38 is, for example, constituted with a band gap circuit, which can adjust reference voltage $V_{REF}$.

Figure 6A:
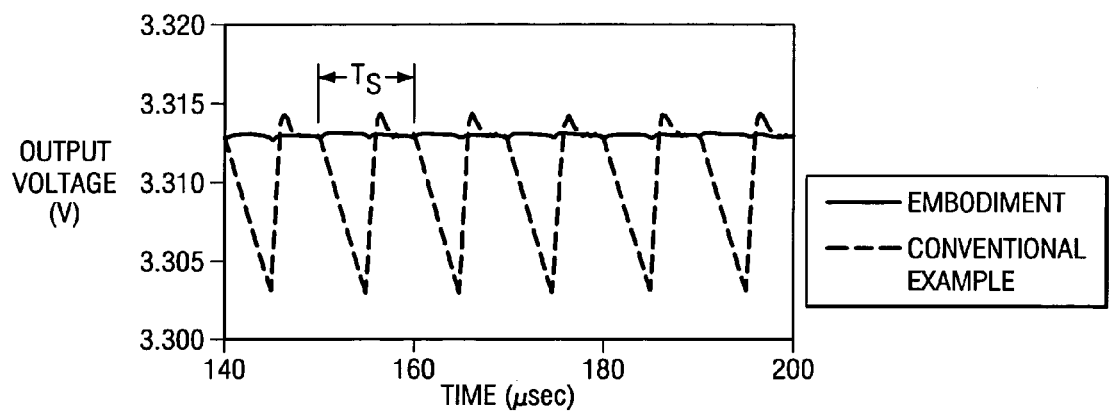
FIG. 6 is a voltage waveform diagram comparing the simulated output voltage obtained in the second embodiment with the conventional example.
Figure 6B:
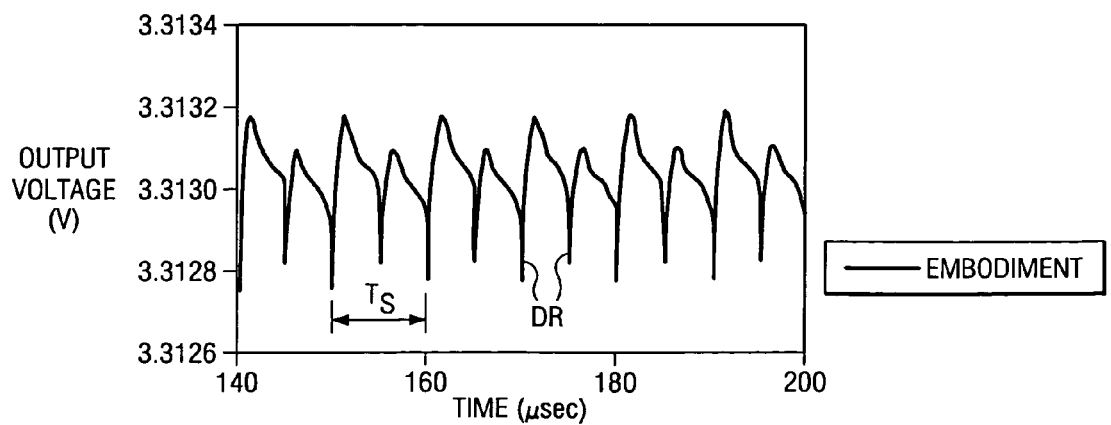

FIG. 6(A) compares the simulated output voltage of the DC/DC converter disclosed in this embodiment (FIG. 5) with the conventional example (FIG. 15). FIG. 6(B) shows the output voltage waveform of the embodiment after the scale of the ordinate (output voltage) is enlarged. $V_{in}$=2.4 V, $V_{out}$=3.3 V, $C_a$=$C_b$=0.1 μF, $I_{out}$=2 mA, $F_{osc}$=100 kHz are set as the main conditions. The voltage ripple of the conventional example is about 11 mV. On the other hand, the voltage ripple of this embodiment is about 0.4 mV. The voltage ripple is reduced to about ½8.

When said feedback circuit 32 is used, since the reference voltage $V_{REF}$ of reference voltage generator 38 can be adjusted, it is possible to finely set or adjust the output voltage $V_{out}$.

As shown in FIG. 6(B), in this embodiment, the output voltage $V_{out}$ drops instantaneously every half switching cycle. Said drop DR is caused for the following reason. During the period of switching from phase I to phase II or vice versa, all of transistors 16–28 in switch circuit network (FIG. 3) are turned off simultaneously. As a result, voltage output terminal 14 is cut off from the side of voltage input terminal 12 or DC power supply 10.

FIG. 7 shows the theory of the charge pump type DC/DC converter disclosed in the third embodiment of the present invention. In this embodiment, the first flying capacitor $C_a$ is comprised of n (n is an integer of 2 or larger) capacitor elements $C_{a1}$, . . . , $C_{an}$. In phase I, said n capacitor elements $C_{a1}$, . . . , $C_{an}$ are connected in series. In phase II, said n capacitor elements $C_{a1}$, . . . , $C_{an}$ are connected in parallel with each other. The remaining part is identical to the first or second embodiment.

Figure 7A:
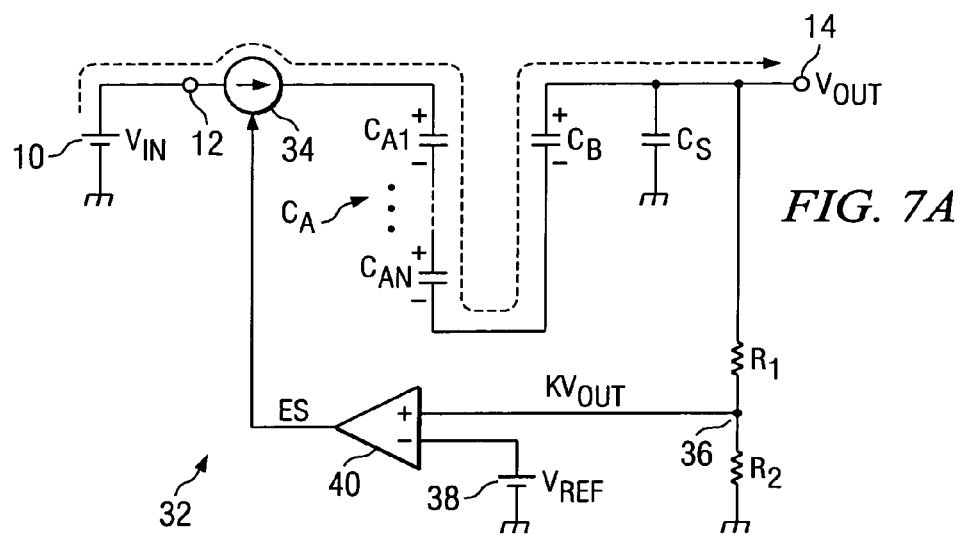
FIG. 7 is a circuit diagram illustrating the theory of the charge pump type DC/DC converter disclosed in the third embodiment of the present invention.
Figure 7B:
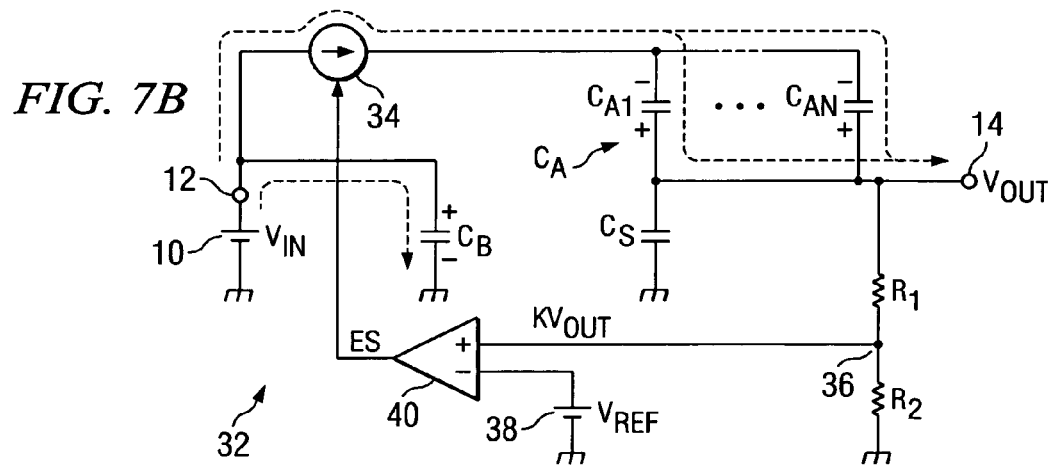

More specifically, in phase I, as shown in FIG. 7(A), n capacitor elements $C_{a1}$, . . . $C_{an}$ are connected in series in such a way that the positive terminal of each capacitor element faces the side of voltage input terminal 12 to form one serial capacitor circuit. In phase II, as shown in FIG. 7(B), said n capacitor elements $C_{a1}$, . . . $C_{an}$ are connected in parallel with each other in such a way that the positive terminal of each capacitor element faces the side of voltage output terminal 14 to form one parallel capacitor circuit. It is preferred to set the capacitances of capacitor elements $C_{a1}$, . . . $C_{an}$ at the same value.

In this embodiment, the output voltage $V_{out}$ obtained at voltage output terminal 14 is derived as follows. If the charged voltage or voltage drop of each of capacitor elements $C_{a1}, \ldots C_{an}$ that constitute flying capacitor $C_a$ is taken as $V_{ca}$ and the charged voltage or voltage drop of flying capacitor $C_b$ is taken as $V_{cb}$, in phase I, equation (5) becomes valid for each capacitor element of flying capacitor $C_a$, and equation (6) becomes valid for flying capacitor $C_b$.

$$V_{ca} = V_{out} - V_{in} \quad (5)$$

$$V_{cb} = V_{in} \quad (6)$$

In phase I, when n flying capacitor elements $C_{a1}, \ldots, C_{an}$ and flying capacitor $C_b$ are connected in series in the polarities between voltage input terminal 12 and voltage output terminal 14, equation (7) becomes valid.

$$V_{out} = V_{in} - nV_{ca} + V_{cb} \quad (7)$$

Equation (8) can be derived as follows by substituting equations (5) and (6) into equation (7).

$$V_{out} = \{1 + 1/(n+1)\} V_{in} \quad (8)$$

According to this embodiment, the boosting rate can be adjusted in a stepwise manner in a prescribed range of 1 (when n=∞)–1.33 (when n=2) corresponding to the number (n) of capacitor elements $C_{a1}, \ldots C_{an}$ that constitute the first flying capacitor $C_a$.

Since feedback circuit 32 is also adopted in this embodiment, the ripple in output voltage $V_{out}$ can be further reduced, and the output voltage level can be finely set or adjusted.

The ratio of the load current supply ability between phase I, in which the n flying capacitor elements $C_{a1}, \ldots C_{an}$ of the first flying capacitor $C_a$ are connected in series, and phase II, in which the capacitor elements are connected in parallel with each other, is 1:n. Consequently, by setting the duty ratios of phases I and II in a relationship (1:n) corresponding to the load current supply ability, that is, by setting the duty ratio of phase I to 1/(n+1) and setting the duty ratio of phase II to n/(n+1), the load current between the two phases I, II can be uniformized to minimize the voltage ripple.

Figure 8:
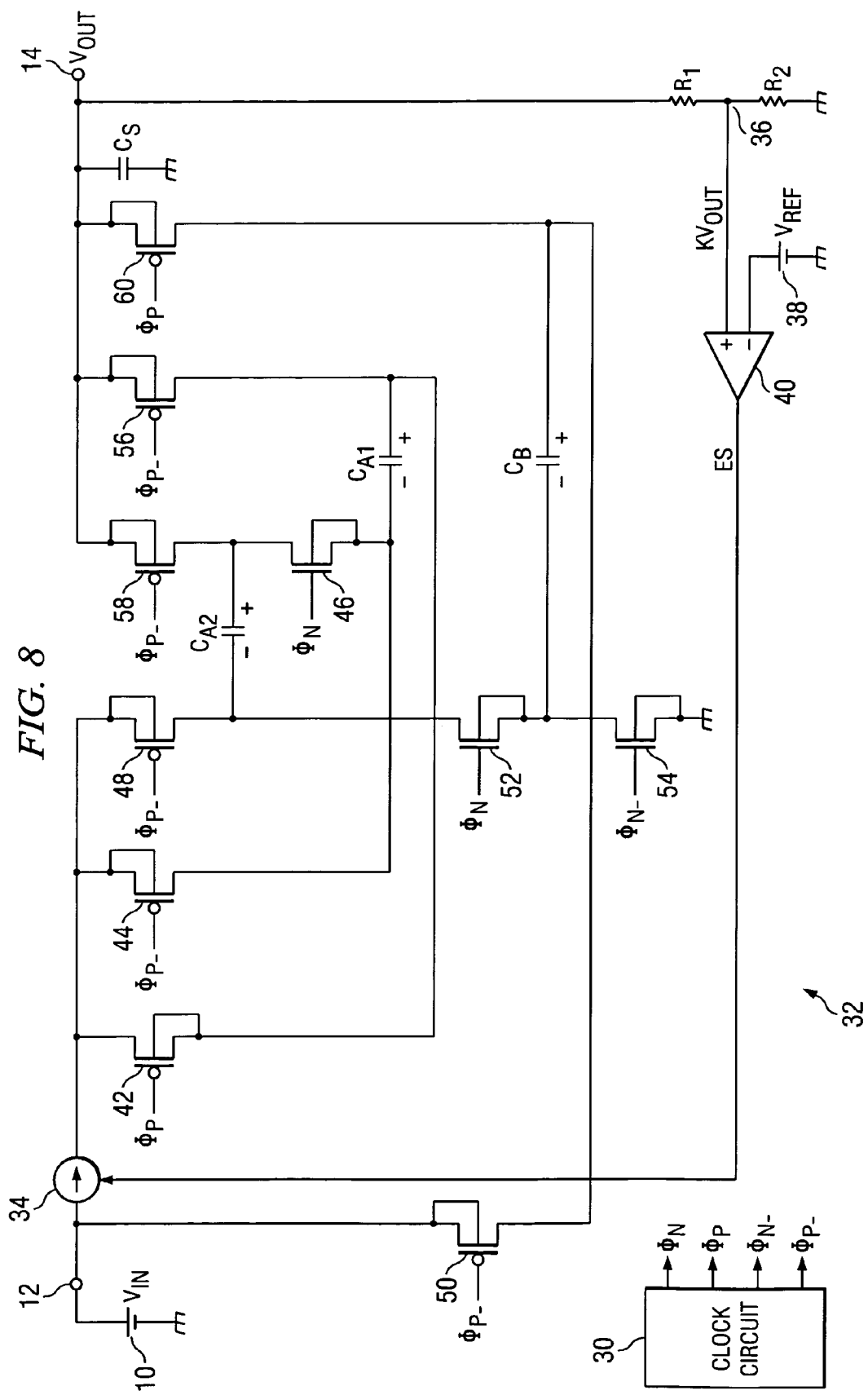
FIG. 8 is a circuit diagram illustrating an example of the switch circuit network used in the third embodiment.

FIG. 8 shows an example of the switch circuit network used in this embodiment when the first flying capacitor $C_a$ is comprised of two capacitor elements $C_{a1}, C_{a2}$ (n=2). This switch circuit network includes 3 NMOS transistors 46, 52, 54 and 7 PMOS transistors 42, 44, 48, 50, 56, 58, 60 as switching elements.

The source terminal of PMOS transistor 42 is connected to voltage input terminal 12 via current control circuit 34, and its drain terminal is connected to the positive terminal of flying capacitor element $C_{a1}$. The source terminal of PMOS transistor 44 is connected to voltage input terminal 12 via current control circuit 34, and its drain terminal is connected to the negative terminal of flying capacitor element $C_{a1}$. The source terminal of NMOS transistor 46 is connected to the negative terminal of flying capacitor element $C_{a1}$, and its drain terminal is connected to the positive terminal of flying capacitor element $C_{a2}$. The source terminal of PMOS transistor 48 is connected to voltage input terminal 12 via current control circuit 34, and its drain terminal is connected to the negative terminal of flying capacitor element $C_{a2}$. The source terminal of PMOS transistor 50 is connected to voltage input terminal 12, and its drain terminal is connected to the positive terminal of flying capacitor $C_b$. The drain terminal of NMOS transistor 52 is connected to the negative terminal of flying capacitor element $C_{a2}$, and its source terminal is connected to the negative terminal of flying capacitor $C_b$. The drain terminal of NMOS transistor 54 is connected to the negative terminal of flying capacitor $C_b$, and its source terminal is connected to the ground potential. The drain terminal of PMOS transistor 56 is connected to the positive terminal of flying capacitor element $C_{a1}$, and its source terminal is connected to voltage output terminal 14. The drain terminal of PMOS transistor 58 is connected to the positive terminal of flying capacitor element $C_{a2}$, and its source terminal is connected to voltage output terminal 14. The drain terminal of PMOS transistor 60 is connected to the positive terminal of flying capacitor $C_b$, and its source terminal is connected to voltage output terminal 14.

Clock signal $\phi_N$ is sent from clock circuit 30 to the gate terminals of NMOS transistors 46, 52. Clock signal $\phi_{N-}$ is sent from clock circuit 30 to the gate terminal of NMOS transistor 54. Clock signal $\phi_P$ is sent from clock circuit 30 to the gate terminals of PMOS transistors 42, 60. Clock signal $\phi_{P-}$ is sent from clock circuit 30 to PMOS transistors 44, 48, 50, 56, 58. Clock signals $\phi_N, \phi_{N-}, \phi_P, \phi_{P-}$ are identical to the clock signals shown in FIG. 3. For the same reason described for PMOS transistors 16 and 20 shown in FIG. 3, the back gates of PMOS transistors 42 and 50 are connected to the positive terminals of capacitor $C_{a1}$ and capacitor $C_b$, respectively.

When $\phi_N, \phi_{P-}$ are at H level and $\phi_{N-}, \phi_P$ are at L level, transistors 42, 46, 52, and 60 are turned on, while transistors 44, 48, 50, 54, 56, and 58 are turned off. The connection state of phase I shown in FIG. 7(A) is obtained.

When $\phi_N, \phi_{P-}$ are at L level and $\phi_{N-}, \phi_P$ are at H level, transistors 42, 46, and 52 are turned off, while transistors 44, 48, 50, 54, 56, and 58 are turned on. The connection state of phase II shown in FIG. 7(B) is obtained.

In this embodiment, it is also possible to set a period, during which clock signals $\phi_N, \phi_{N-}$ become L level simultaneously or clock signals $\phi_P, \phi_{P-}$ become H level simultaneously, to turn off all of transistors 42–58 simultaneously.

FIG. 9 shows the theory of the charge pump type DC/DC converter disclosed in the fourth embodiment of the present invention. In this embodiment, the first flying capacitor $C_a$ is comprised of n (n is an integer of 2 or larger) capacitor elements $C_{a1}, \ldots, C_{an}$. In phase I, said capacitor elements $C_{a1}, \ldots, C_{an}$ are connected in parallel with each other. In phase II, said capacitor elements $C_{a1}, \ldots, C_{an}$ are connected in series. The remaining part is identical to the first or second embodiment.

Figure 9A:
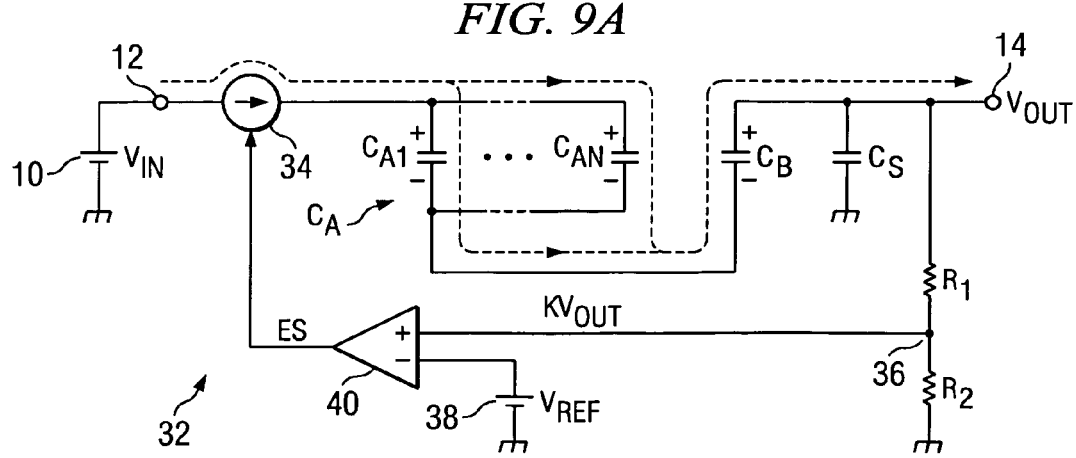
FIG. 9 is a circuit diagram illustrating the theory of the charge pump type DC/DC converter disclosed in the fourth embodiment of the present invention.
Figure 9B:
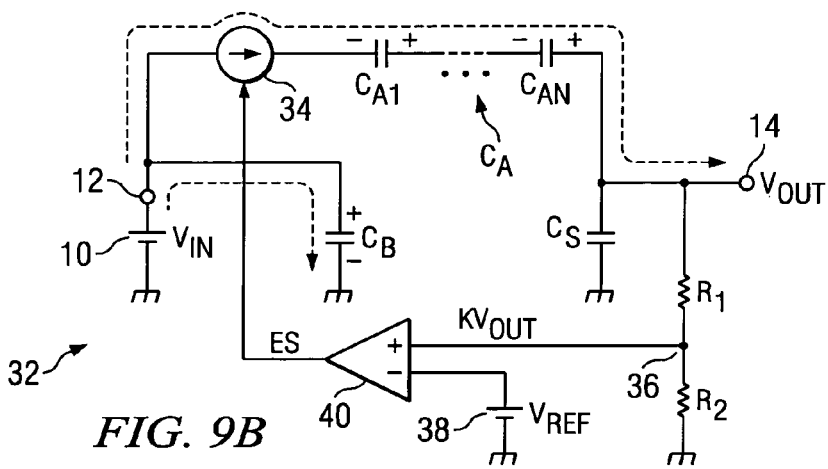

More specifically, in phase I, as shown in FIG. 9(A), n capacitor elements $C_{a1}, \ldots C_{an}$ are connected in parallel with each other in such a way that the positive terminal of each capacitor element faces the side of voltage input terminal 12 to form one parallel capacitor circuit. In phase II, as shown in FIG. 9(B), said n capacitor elements $C_{a1}, \ldots C_{an}$ are connected in series in such a way that the positive terminal of each capacitor element faces the side of voltage output terminal 14 to form one serial capacitor circuit. It is preferred to set the capacitances of capacitor elements $C_{a1}, \ldots C_{an}$ at the same value.

In this embodiment, the output voltage $V_{out}$ obtained at voltage output terminal 14 is derived as follows. The charged voltage or voltage drop of each of capacitor elements $C_{a1}, \ldots C_{an}$ that constitute flying capacitor $C_a$ is taken as $V_{ca}$, and the charged voltage or voltage drop of flying capacitor $C_b$ is taken as $V_{cb}$. In phase II, equation (9)

becomes valid for each capacitor element of flying capacitor $C_a$, and equation (10) becomes valid for flying capacitor $C_b$.

$$V_{ca}=(V_{out}-V_{in})/n \quad (9)$$

$$V_{cb}=V_{in} \quad (10)$$

In phase I, when n flying capacitor elements $C_{a1}, \ldots, C_{an}$ and flying capacitor $C_b$ are connected in series in the polarities between voltage input terminal 12 and voltage output terminal 14, equation (11) becomes valid.

$$V_{out}=V_{in}-V_{ca}+V_{cb} \quad (11)$$

Equation (12) can be derived as follows by substituting equations (9) and (10) into equation (11).

$$V_{out}=\{2-1/(n+1)\}V_{in} \quad (12)$$

According to this embodiment, the boosting rate can be adjusted in a stepwise manner in a prescribed range of 1.67 (when n=2)–2 (when n=∞) corresponding to the number (n) of capacitor elements $C_{a1}, \ldots C_{an}$ that constitute the first flying capacitor $C_a$.

Since feedback circuit 32 is also adopted in this embodiment, the ripple in output voltage $V_{out}$ can be further reduced, and the output voltage level can be finely set or adjusted.

The ratio of the load current supply ability between phase I, in which the n flying capacitor elements $C_{a1}, \ldots C_{an}$ of the first flying capacitor $C_a$ are connected in parallel with each other, and phase II, in which the capacitor elements are connected in series, is n:1. Consequently, by setting the duty ratios of phases I and II in a relationship (n:1) corresponding to the load current supply ability, that is, by setting the duty ratio of phase I to n/(n+1) and setting the duty ratio of phase II to 1/(n+1), the load current between the two phases I, II can be uniformized to minimize the voltage ripple.

Figure 10:
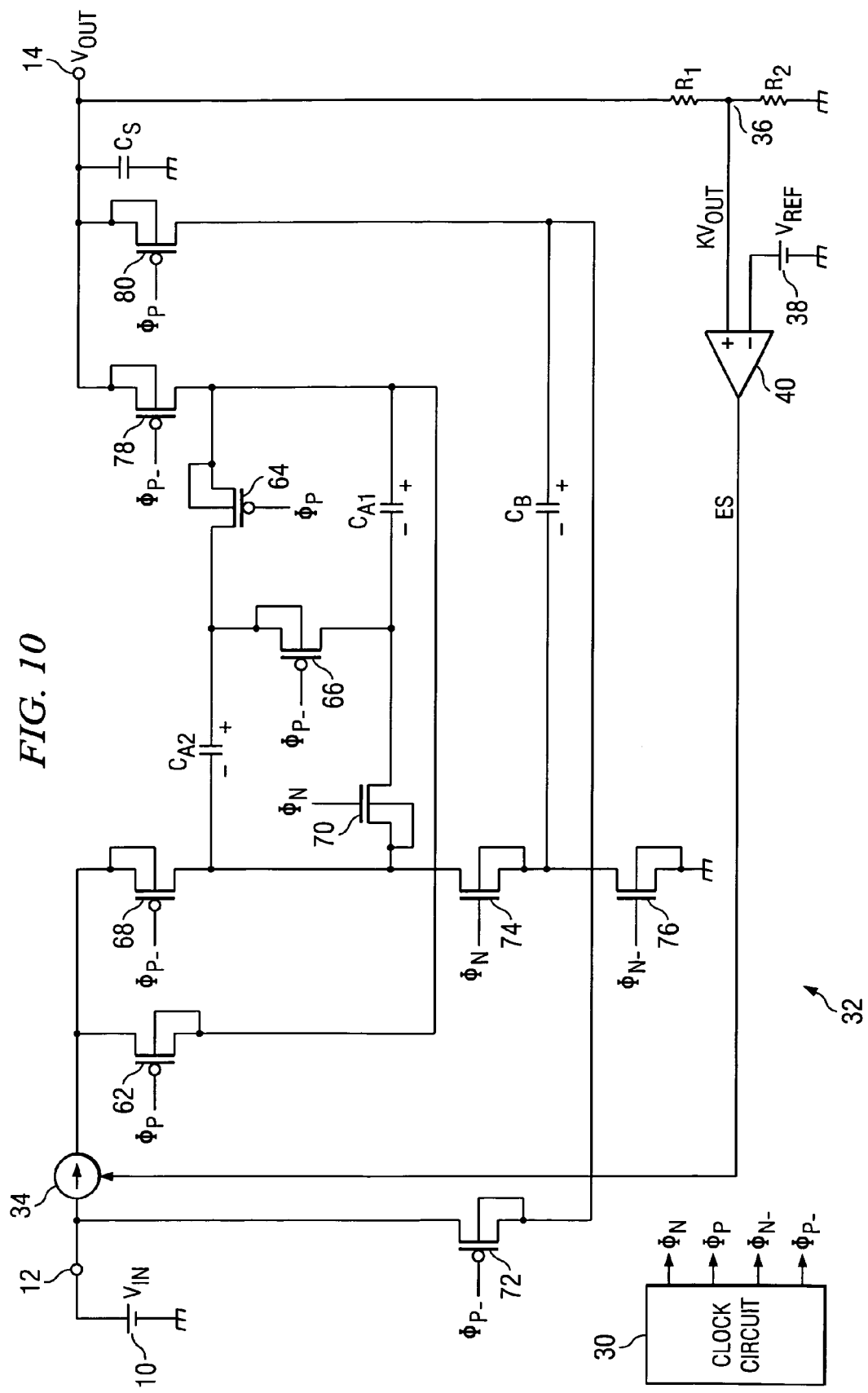
FIG. 10 is a circuit diagram illustrating an example of the switch circuit network used in the fourth embodiment.

FIG. 10 shows an example of the switch circuit network used in this embodiment when the first flying capacitor $C_a$ is comprised of two capacitor elements $C_{a1}, C_{a2}$ (n=2). This switch circuit network includes 3 NMOS transistors 70, 74, 76 and 7 PMOS transistors 62, 64, 66, 68, 72, 78, 80 as the switching elements.

The source terminal of PMOS transistor 62 is connected to voltage input terminal 12 via current control circuit 34, and its drain terminal is connected to the positive terminal of flying capacitor element $C_{a1}$. The source terminal of PMOS transistor 64 is connected to the positive terminal of flying capacitor element $C_{a1}$, and the drain terminal is connected to the positive terminal of flying capacitor element $C_{a2}$. The drain terminal of PMOS transistor 66 is connected to the negative terminal of flying capacitor element $C_{a1}$, and its source terminal is connected to the positive terminal of flying capacitor element $C_{a2}$. The source terminal of PMOS transistor 68 is connected to voltage input terminal 12 via current control circuit 34, and its drain terminal is connected to the negative terminal of flying capacitor element $C_{a2}$. The source terminal of NMOS transistor 70 is connected to the negative terminal of flying capacitor element $C_{a2}$, and its drain terminal is connected to the negative terminal of flying capacitor element $C_{a1}$. The source terminal of PMOS transistor 72 is connected to voltage input terminal 12, and its drain terminal is connected to the positive terminal of flying capacitor $C_b$. The drain terminal of NMOS transistor 74 is connected to the negative terminal of flying capacitor element $C_{a2}$, and its source terminal is connected to the negative terminal of flying capacitor $C_b$. The drain terminal of NMOS transistor 76 is connected to the negative terminal of flying capacitor $C_b$, and its source terminal is connected to the ground potential. The drain terminal of PMOS transistor 78 is connected to the positive terminal of flying capacitor element $C_{a1}$, and its source terminal is connected to voltage output terminal 14. The drain terminal of PMOS transistor 80 is connected to the positive terminal of flying capacitor $C_b$, and its source terminal is connected to voltage output terminal 14.

Clock signal $\phi_N$ is sent from clock circuit 30 to the gate terminals of NMOS transistors 70, 74. Clock signal $\phi_{N-}$ is sent from clock circuit 30 to the gate terminal of NMOS transistor 76. Clock signal $\phi_P$ is sent from clock circuit 30 to the gate terminals of PMOS transistors 62, 64, 80. Clock signal $\phi_{P-}$ is sent from clock circuit 30 to PMOS transistors 66, 68, 72, 78. Clock signals $\phi_N$, $\phi_{N-}$, $\phi_P$, $\phi_{P-}$ are identical to the clock signals shown in FIG. 3. For the same reason described for PMOS transistors 16 and 20 shown in FIG. 3, the back gates of PMOS transistors 62 and 72 are connected to the positive terminals of capacitor $C_{a1}$ and capacitor $C_b$, respectively.

When $\phi_N$, $\phi_{P-}$ are at H level and $\phi_{N-}$, $\phi_P$ are at L level, transistors 62, 64, 70, 74, and 80 are turned on, while transistors 66, 68, 72, 76, and 78 are turned off. The connection state of phase I shown in FIG. 9(A) is obtained.

When $\phi_N$, $\phi_{P-}$ are at L level and $\phi_{N-}$, $\phi_P$ are at H level, transistors 62, 64, 70, 74, and 80 are turned off, while transistors 66, 68, 72, 76, and 78 are turned on. The connection state of phase II shown in FIG. 9(B) is obtained.

In this embodiment, it is also possible to set a period, during which clock signals $\phi_{N-}$, $\phi_{N-}$ become L level simultaneously or clock signals $\phi_P$, $\phi_{P-}$ become H level simultaneously, to turn off all of transistors 62–78 simultaneously.

FIG. 11 shows the theory of the charge pump type DC/DC converter disclosed in the fifth embodiment of the present invention. In this embodiment, the first flying capacitor $C_a$ is comprised of n×m (n, m are integers of 2 or larger) capacitor elements $C_{a1}, \ldots, C_{an}$. In phase I, among said capacitor elements $C_{a1}, \ldots, C_{an}$, all n capacitor elements are connected in series, and these serial capacitor circuits are connected in parallel in m columns. In phase II, among said capacitor elements $C_{a1}, \ldots, C_{an}$, all m capacitor elements are connected in series, and these serial capacitor circuits are connected in parallel in n columns. The remaining part is identical to the first or second embodiment.

Figure 11A:
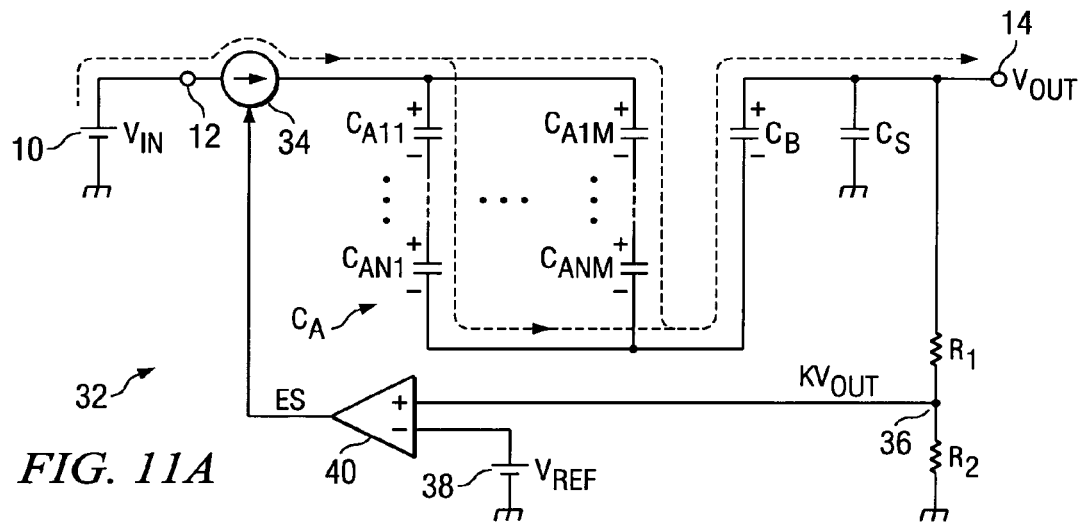
FIG. 11 is a circuit diagram illustrating the theory of the charge pump type DC/DC converter disclosed in the fifth embodiment of the present invention.
Figure 11B:
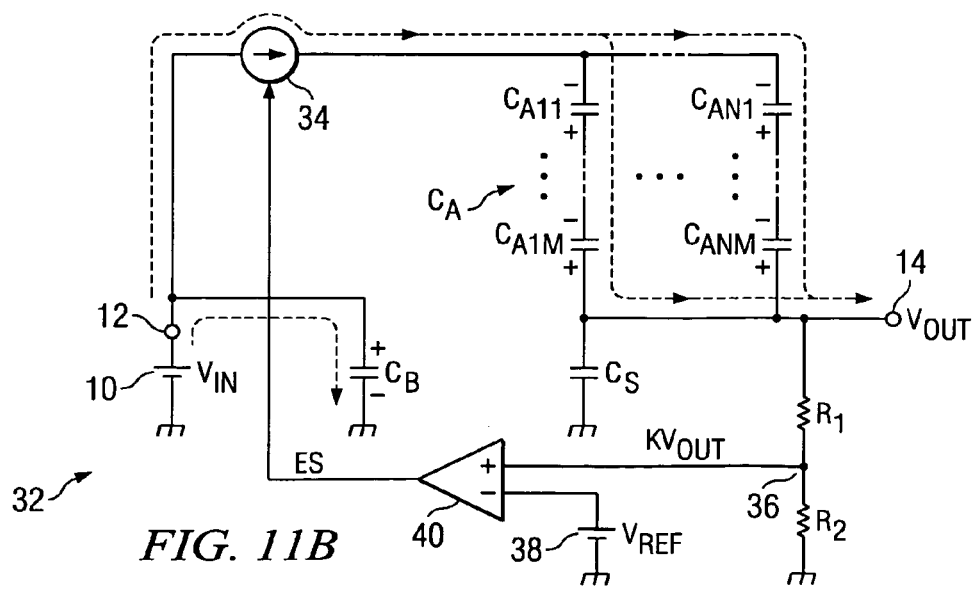

More specifically, in phase I, as shown in FIG. 11(A), the n×m capacitor elements $(C_{a11}, \ldots, C_{an1}), \ldots, (C_{a1m}, \ldots, C_{anm})$ in the first flying capacitor $C_a$ form m serial capacitor circuits with n capacitor elements in each circuit. Said m serial capacitor circuits are connected in parallel with each other. In this case, the positive terminal of each of capacitor elements $C_{a11}, \ldots, C_{anm}$ faces the side of voltage input terminal 12. In phase II, as shown in FIG. 11(B), the n×m capacitor elements $(C_{a11}, \ldots, C_{a1m}), \ldots, (C_{an1}, \ldots, C_{anm})$ in the first flying capacitor $C_a$ form n serial capacitor circuits with m capacitor elements in each circuit. Said n serial capacitor circuits are connected in parallel with each other. In this case, the positive terminal of each of capacitor elements $C_{a1}, \ldots, C_{anm}$ faces the side of voltage output terminal 14. It is preferred to set the capacitances of capacitor elements $C_{a11}, \ldots, C_{anm}$ at the same value.

In this embodiment, the output voltage $V_{out}$ obtained at voltage output terminal 14 is derived as follows. The charged voltage or voltage drop of each of capacitor elements $C_{a11}, \ldots, C_{anm}$ that constitute flying capacitor $C_a$ is taken as $V_{ca}$, and the charged voltage or voltage drop of flying capacitor $C_b$ is taken as $V_{cb}$. In phase II, when each column of m capacitor elements, for example, $(C_{a11}, \ldots, C_{a1m})$ is connected in series in the polarity between voltage input terminal 12 and voltage output terminal 14, equation (13) becomes valid for each flying capacitor element. Also, equation (14) becomes valid for flying capacitor $C_b$ connected in the polarity between voltage input terminal 12 and the ground potential.

$$V_{ca}=(V_{out}-V_{in})/m \quad (13)$$

$$V_{cb}=V_{in} \quad (14)$$

In phase I, when the serial capacitor circuit comprised of n flying capacitor elements, for example, $(C_{a11}, \ldots, C_{an1})$ and flying capacitor $C_P$ are connected in series in the polarity between voltage input terminal 12 and voltage output terminal 14, equation (15) becomes valid.

$$V_{out}=V_{in}-nV_{ca}+V_{cb} \quad (15)$$

Equation (16) can be derived by substituting equations (13) and (14) into equation (15).

$$V_{out}=\{1+m/(n+m)\}V_{in} \quad (16)$$

According to this embodiment, the boosting rate can be adjusted in a stepwise manner in a prescribed range of 1 (when n=∞)–2 (when m=∞) corresponding to the number (n×m) of capacitor elements $C_{a1}, \ldots, C_{anm}$ that constitute the first flying capacitor $C_a$.

Since feedback circuit 32 is also adopted in this embodiment, the ripple in output voltage $V_{out}$ can be further reduced, and the output voltage level can be finely set or adjusted.

The ratio of the load current supply ability between phase I, in which the n×m flying capacitor elements $C_{a11}, \ldots C_{anm}$ of the first flying capacitor $C_a$ are connected in m columns that are parallel to each other, and phase II, in which the capacitor elements are connected in n columns that are parallel to each other, is m:n. Consequently, by setting the duty ratios of phases I and II in a relationship (m:n) corresponding to the load current supply ability, that is, by setting the duty ratio of phase I at m/(n+m) and setting the duty ratio of phase II at n/(n+m), the load current between the two phases I, II can be uniformized to minimize the voltage ripple.

Figure 12:
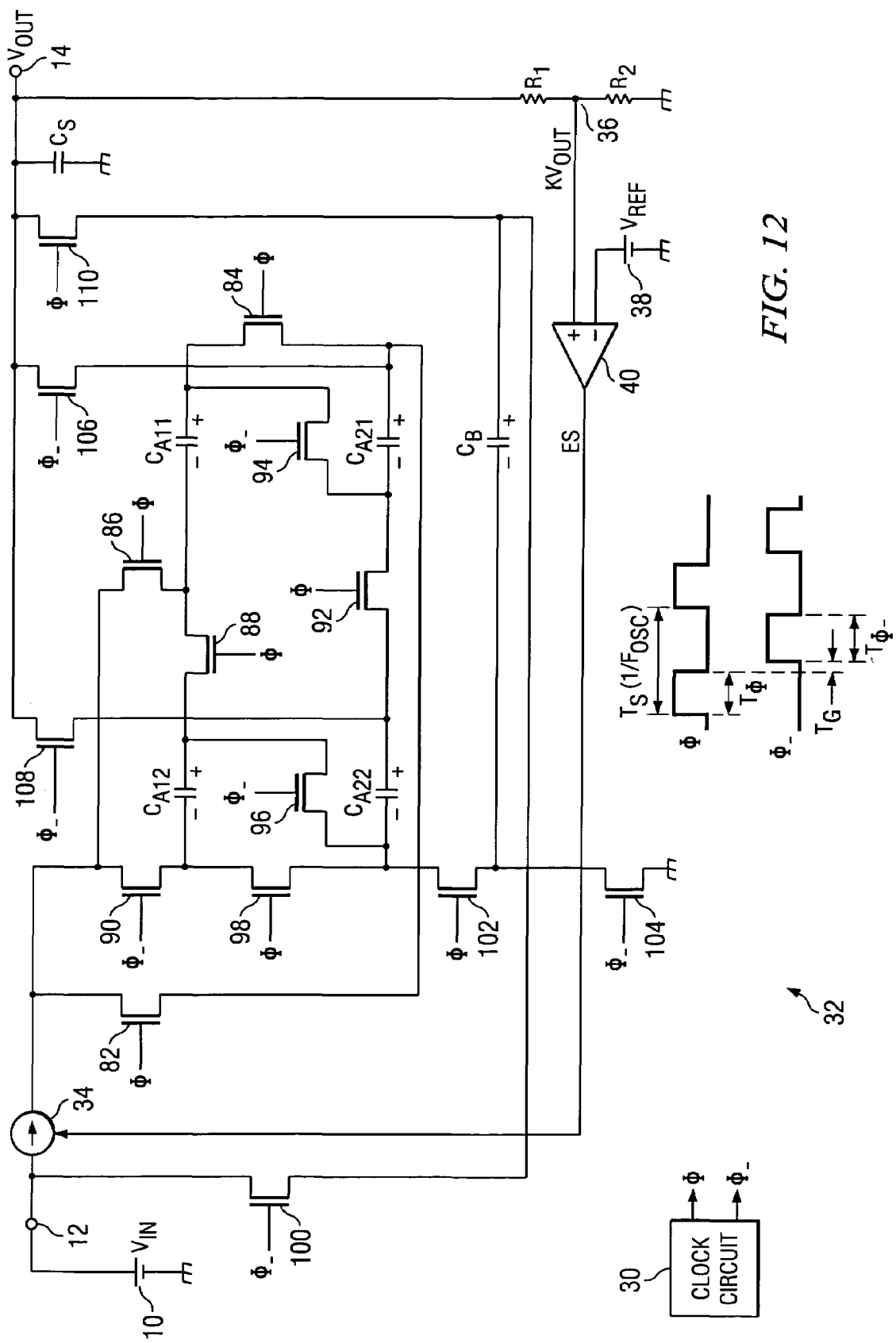
FIG. 12 is a circuit diagram illustrating an example of the switch circuit network used in the fifth embodiment.
Figure 13A:
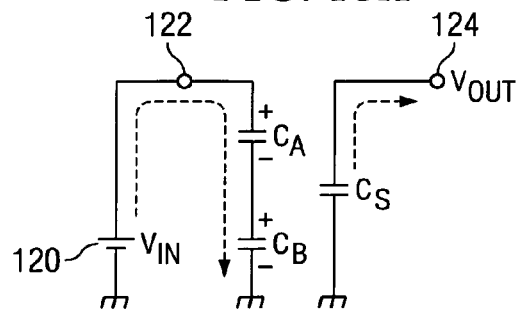
FIG. 13 is a circuit diagram illustrating the theory of a conventional charge pump type DC/DC converter.
Figure 13B:
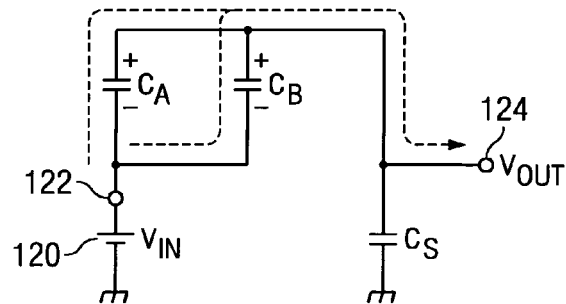
Figure 14:
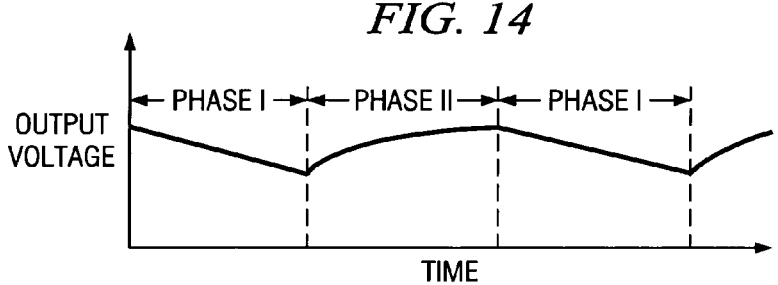
FIG. 14 is a voltage waveform diagram schematically illustrating the waveform of the output voltage obtained by the conventional charge pump type DC/DC converter.

FIG. 12 shows an example of the switch circuit network used in this embodiment when the first flying capacitor $C_a$ is comprised of four capacitor elements $C_{a11}, C_{a12}, C_{a21}, C_{a22}$ (n=2, m=2). This switch circuit network includes 15 NMOS transistors 82, 84, 86, 88, 90, 92, 94, 96, 98, 100, 102, 104, 106, 108, and 110 as switching elements.

The drain terminal of NMOS transistor 82 is connected to voltage input terminal 12 via current control circuit 34, and its source terminal is connected to the positive terminal of flying capacitor element $C_{a21}$. The drain terminal of NMOS transistor 84 is connected to the positive terminal of flying capacitor element $C_{a21}$, and its source terminal is connected to the positive terminal of flying capacitor element $C_{a11}$. The drain terminal of NMOS transistor 86 is connected to voltage input terminal 12 via current control circuit 34, and its source terminal is connected to the negative terminal of flying capacitor element $C_{a11}$. The source terminal of NMOS transistor 88 is connected to the negative terminal of flying capacitor element $C_{a11}$, and its drain terminal is connected to the positive terminal of flying capacitor $C_{a12}$. The drain terminal of NMOS transistor 90 is connected to voltage input terminal 12 via current control circuit 34, and its source terminal is connected to the negative terminal of flying capacitor element $C_{a12}$. The source terminal of NMOS transistor 92 is connected to the negative terminal of flying capacitor element $C_{a21}$, and its drain terminal is connected to the positive terminal of flying capacitor element $C_{a22}$. The drain terminal of NMOS transistor 94 is connected to the positive terminal of flying capacitor element $C_{a11}$, and its source terminal is connected to the negative terminal of flying capacitor element $C_{a21}$. The drain terminal of NMOS transistor 96 is connected to the positive terminal of flying capacitor element $C_{a12}$, and its source terminal is connected to the negative terminal of flying capacitor element $C_{a22}$. The source terminal of NMOS transistor 98 is connected to the negative terminal of flying capacitor element $C_{a12}$, and its drain terminal is connected to the negative terminal of flying capacitor element $C_{a22}$. The drain terminal of NMOS transistor 100 is connected to voltage input terminal 12, and its source terminal is connected to the positive terminal of flying capacitor $C_b$. The drain terminal of NMOS transistor 102 is connected to the negative terminal of flying capacitor element $C_{a22}$, and its source terminal is connected to the negative terminal of flying capacitor $C_b$. The drain terminal of NMOS transistor 104 is connected to the negative terminal of flying capacitor $C_b$, and its source terminal is connected to the ground potential. The source terminal of NMOS transistor 106 is connected to the positive terminal of flying capacitor element $C_{a21}$, and its drain terminal is connected to the voltage output terminal. The source terminal of NMOS transistor 108 is connected to the positive terminal of flying capacitor element $C_{a22}$, and its drain terminal is connected to the voltage output terminal. The source terminal of NMOS transistor 110 is connected to the positive terminal of flying capacitor $C_b$, and its drain terminal is connected to the voltage output terminal.

Clock signal φ is supplied from clock circuit 30 to the gate terminals of NMOS transistors 82, 84, 88, 92, 98, 102, and 110. Clock signal φ– is supplied from clock circuit 30 to the gate terminals of NMOS transistors 86, 90, 94, 96, 100, 104, 106, and 108. The phase difference between the two clock signals φ and φ– is 180°.

When φ is at H level and φ– is at L level, NMOS transistors 82, 84, 88, 92, 98, 102, and 110 are turned on, while NMOS transistors 86, 90, 94, 96, 100, 104, 106, and 108 are turned off. The connection state of phase I shown in FIG. 11(A) is obtained.

When φ is at L level and φ– is at H level, NMOS transistors 82, 84, 88, 92, 98, 102, and 110 are turned off, while NMOS transistors 86, 90, 94, 96, 100, 104, 106, and 108 are turned on. The connection state of phase II shown in FIG. 11(B) is obtained.

In this embodiment, it is also preferred to set a period, in which both clock signals φ and φ– go to L level simultaneously, in the phase switching period to turn off all of NMOS transistors 82–110 simultaneously.

In the third–fifth embodiments described above, flying capacitor $C_b$ can be constituted with one or several capacitor elements. Similarly, the smoothing capacitor $C_s$ can also be constituted with one or several capacitor elements.

In the embodiments shown in FIGS. 3, 8, and 10, PMOS transistors and NMOS transistors are used in proper combination as the switching elements. However, it is also possible to only use NMOS transistors as described in the embodiment shown in FIG. 12. It is also possible to use PMOS transistors or other switching elements. In the embodiment shown in FIG. 12, it is also possible to use PMOS transistors and NMOS transistors in proper combination as the switching elements or use other switching elements.

As explained above, by using the charge pump type DC/DC converter disclosed in the present invention, the ripple characteristic of the output voltage can be improved significantly, and stepwise or fine adjustment of the boosting rate can be conducted easily. Also, compared with conventional technology, the ripple characteristic of the output voltage can be improved significantly without increasing the number of flying capacitors used.

What is claimed is:

1. A charge pump type DC/DC converter comprising:
a voltage input terminal connected to the output terminal of a DC cower supply;
first and second capacitors;
a voltage output terminal connected to a load;
a switch circuit network having a first phase, in which a first terminal of the first capacitor is connected to the voltage input terminal, a first terminal of the second capacitor is connected to the voltage output terminal, and a second terminal of the first capacitor and a second terminal of the second capacitor are connected to each other, and a second phase, in which the first and second terminals of the first capacitor are connected to the voltage output terminal and the voltage input terminal, respectively, and the first and second terminals of the second capacitor are connected to the voltage input terminal and a reference potential, respectively;
a switching controller that controls the switch circuit network to switch the first and second phases alternately at prescribed duty ratios;
wherein the first capacitor is comprised of n (n is an integer of 2 or larger) capacitor elements, the n capacitor elements are connected in series in the firstphase, and the n capacitor elements are connected in parallel with each other in the second phase, and wherein output voltage ($V_{olt}$ is defined by $V_{olt}=[1+1/(N+1)]$ Vinput.

2. The DC/DC converter described in claim 1 wherein the first capacitor is a one capacitor element.

3. The DC/DC converter described in claim 2 wherein the capacitance of the first capacitor is approximately equal to that of the second capacitor.

4. The DC/DC converter described in claim 1 wherein the duty ratios of the first and second phases are set at about ½.

5. The DC/DC converter described in claim 1 wherein the n capacitor elements have approximately the same capacitance.

6. The DC/DC converter described in claim 1 wherein the duty ratio of the first phase is set at about 1/(n+1), and the duty ratio of the second phase is set at about n/(n+1).

7. The DC/DC converter described in claim 1 wherein the first capacitor is comprised of first and second capacitor elements and the switch circuit network comprises:
a first MOS transistor with a first terminal connected to the voltage input terminal and a second terminal connected to the first terminal of the first capacitor element;
a second MOS transistor with a first terminal connected to the voltage input terminal and a second terminal connected to the second terminal of the first capacitor element;
a third MOS transistor with a first terminal connected to the second terminal of the first capacitor element and a second terminal connected to the first terminal of the second capacitor element;
a fourth MOS transistor with a first terminal connected to the voltage input terminal and a second terminal connected to the second terminal of the second capacitor element;
a fifth MOS transistor with a first terminal connected to the voltage input terminal and a second terminal connected to the first terminal of the second capacitor;
a sixth MOS transistor with a first terminal connected to the second terminal of the second capacitor element and a second terminal connected to the second terminal of the second capacitor;
a seventh MOS transistor with a first terminal connected to the second terminal of the second capacitor and a second terminal connected to the reference potential;
an eighth MOS transistor with a first terminal connected to the first terminal of the first capacitor element and a second terminal connected to the voltage output terminal;
a ninth MOS with a first terminal connected to the first terminal of the second capacitor element and a second terminal connected to the voltage output terminal; and
a tenth MOS transistor with a first terminal connected to the first terminal of the second capacitor and a second terminal connected to the voltage output terminal;
in the first phase, the switching controller keeps the first, third, sixth, and tenth MOS transistors in the on state, and the second, fourth, fifth, seventh, eighth, and ninth MOS transistors in the off state;
wherein in the second phase, the switching controller keeps, the first, third, sixth, and tenth MOS transistors in the off state, and the second, fourth, fifth, seventh, eighth, and ninth MOS transistors in the on state.

8. The DC/DC converter described claim 1 wherein the first capacitor is comprised of first and second capacitor elements; the switch circuit network has the following:
a first MOS transistor with a first terminal connected to the voltage input terminal and a second terminal connected to the first terminal of the first capacitor element;
a second MOS transistor with a first terminal connected to the second terminal of the first MOS transistor and a second terminal connected to the first terminal of the second capacitor element;
a third MOS transistor with a first terminal connected to the second terminal of the first capacitor element and a second terminal connected to the first terminal of the second capacitor element;
a fourth MOS transistor with a first terminal connected to the voltage input terminal and a second terminal connected to the second terminal of the second capacitor element;
a fifth MOS transistor with a first terminal connected to the second terminal of the first capacitor element and a second terminal connected to the second terminal of the second capacitor element;
a sixth MOS transistor with a first terminal connected to the voltage input terminal and a second terminal connected to the first terminal of the second capacitor;
a seventh MOS transistor with a first terminal connected to the second terminal of the second capacitor element and a second terminal connected to the second terminal of the second capacitor;
an eighth MOS transistor with a first terminal connected to the second terminal of the second capacitor and a second terminal connected to the reference potential;
a ninth MOS transistor with a first terminal connected to the first terminal of the first capacitor element and a second terminal connected to the voltage output terminal; and a tenth MOS transistor with a first terminal connected to the first terminal of the second capacitor and a second terminal connected to the voltage output terminal;

in the first phase, the switching controller keeps the first, second, fifth, seventh, and tenth MOS transistors in the on state, and the third, fourth, sixth, eighth, and ninth MOS transistors in the off state; and wherein in the second phase, the switching controller keeps the first, second, fifth, seventh, and tenth MOS transistors in the off state, and the third, fourth, sixth, eighth, and ninth MOS transistors in the on state.

9. The DC/DC converter described in claim 1 the first capacitor is comprised of n×m (n and m are integers of 2 or larger) capacitor elements; in the first phase, for the n×m capacitor elements, all n capacitor elements are connected in series, and these serial capacitor circuits are connected in parallel in m columns; in the second phase, for the n×m capacitor elements, all m capacitor elements are connected in series, and these serial capacitor circuits are connected in parallel in n columns.

10. The DC/DC converter described in claim 9 wherein the n×m capacitors have approximately the same capacitance.

11. The DC/DC converter described in claim 9 wherein the duty ratio of the first phase is set at about m/(n+m), and the duty ratio of the second phase is set at about n/(n+m).

12. The DC/DC converter described in claim 9 wherein the first capacitor is comprised of first, second, third, and fourth capacitor elements; the switch circuit network comprises:

a first MOS transistor with a first terminal connected to the voltage input terminal and a second terminal connected to the first terminal of the third capacitor element;

a second MOS transistor with a first terminal connected to the first terminal of the third capacitor element and a second terminal connected to the first terminal of the first capacitor element;

a third MOS transistor with a first terminal connected to the voltage input terminal and a second terminal connected to the second terminal of the first capacitor element;

a fourth MOS transistor with a first terminal connected to the second terminal of the first capacitor element and a second terminal connected to the first terminal of the second capacitor element;

a fifth MOS transistor with a first terminal connected to the voltage input terminal and a second terminal connected to the second terminal of the second capacitor element;

a sixth MOS transistor with a first terminal connected to the second terminal of the third capacitor element and a second terminal connected to the first terminal of the fourth capacitor element;

a seventh MOS transistor with a first terminal connected to the first terminal of the first capacitor element and a second terminal connected to the second terminal of the third capacitor element;

an eighth MOS transistor with a first terminal connected to the first terminal of the second capacitor element and a second terminal connected to the second terminal of the fourth capacitor element;

a ninth MOS transistor with a first terminal connected to the second terminal of the second capacitor element and a second terminal connected to the second terminal of the fourth capacitor element;

a tenth MOS transistor with a first terminal connected to the voltage input terminal and a second terminal connected to the first terminal of the second capacitor;

an eleventh MOS transistor with a first terminal connected to the second terminal of the fourth capacitor element and a second terminal connected to the second terminal of the second capacitor;

a twelfth MOS transistor with a first terminal connected to the second terminal of the second capacitor and a second terminal connected to the reference potential;

a thirteenth MOS transistor with a first terminal connected to the first terminal of the third capacitor element and a second terminal connected to the voltage output terminal;

a fourteenth MOS transistor with a first terminal connected to the first terminal of the fourth capacitor element and a second terminal connected to the voltage output terminal;

a fifteenth MOS transistor with a first terminal connected to the first terminal of the second capacitor and a second terminal connected to the voltage output terminal;

in the first phase, the switching controller keeps the first, second, fourth, sixth, ninth, eleventh, and fifteenth MOS transistors in the on state, and the third, fifth, seventh, eighth, tenth, twelfth, thirteenth, and fourteenth MOS transistors in the off state;

in the second phase, the switching controller keeps the first, second, fourth, sixth, ninth, eleventh, and fifteenth MOS transistors in the off state, and the third, fifth, seventh, eighth, tenth, twelfth, thirteenth, and fourteenth MOS transistors in the on state.

13. The DC/DC converter described in claim 1 further comprising a third capacitor for smoothing with a first terminal connected to the voltage output terminal and a second terminal connected to the reference potential.

14. The DC/DC converter described in claim 1 wherein a current control circuit that is connected in series between the voltage input terminal and the first capacitor, a voltage detector is used for detecting the output voltage obtained at the voltage output terminal, a reference voltage generator that can generates a reference voltage corresponding to the set value of the output voltage output from the voltage output terminal, and a current controller compares the output voltage detected by the voltage detector with the reference voltage and controls the current in the current control circuit corresponding to the comparison error.

15. A charge pump type DC/DC converter comprising:

a voltage input terminal connected to the output terminal of a DC power supply;

first and second capacitors;

a voltage output terminal connected to a load;

a switch circuit network having a first phase, in which a first terminal of the first capacitor is connected to the voltage input terminal, a first terminal of the second capacitor is connected to the voltage output terminal, and a second terminal of the first capacitor and a second terminal of the second capacitor are connected to each other, and a second phase, in which the first and second terminals of the first capacitor are connected to the voltage output terminal and the voltage input terminal, respectively, and the first and second terminals of the second capacitor are connected to the voltage input terminal and a reference potential, respectively;

a switching controller that controls the switch circuit network to switch the first and second phases alternately at prescribed duty ratios;

the switch circuit network comprises:

a first MOS transistor with a first terminal connected to the voltage input terminal and a second terminal connected to the first terminal of the first capacitor;

a second MOS transistor with a first terminal connected to the voltage input terminal and a second terminal connected to the second terminal of the first capacitor;

a third MOS transistor with a first terminal connected to the voltage input terminal and a second terminal connected to the first terminal of the second capacitor;

a fourth MOS transistor with a first terminal connected to the second terminal of the first capacitor and a second terminal connected to the second terminal of the second capacitor;

a fifth MOS transistor with a first terminal connected to the second terminal of the second capacitor and a second terminal connected to the reference potential;

a sixth MOS transistor with a first terminal connected to the first terminal of the first capacitor and a second terminal connected to the voltage output terminal; and a seventh MOS transistor with a first terminal connected to the first terminal of the second capacitor and a second terminal connected to the voltage output terminal;

in the first phase, the switching controller keeps the first, fourth, and seventh MOS transistors in the on state, and the second, third, fifth, and sixth MOS transistors in the off state; and wherein in the second phase, the switching controller keeps the first, fourth, and seventh MOS transistors are kept in the off state, and the second, third, fifth, and sixth MOS transistors in the on state.

16. The DC/DC converter described in claim 15 wherein all of the MOS transistors are turned off simultaneously in the phase switching period between the first and second phases.

* * * * *